United States Patent [19]
Hashima et al.

[11] Patent Number: 5,337,305
[45] Date of Patent: Aug. 9, 1994

[54] INFORMATION STORAGE SYSTEM

[75] Inventors: Kazuo Hashima; Yuji Kawano; Tatsuya Fukami; Kazuhiko Tsutsumi; Yoshiyuki Nakaki; Takashi Tokunaga; Yoshio Fujii, all of Hyogo, Japan

[73] Assignee: Mitsubishi Denki Kabushiki Kaisha, Tokyo, Japan

[21] Appl. No.: 16,030

[22] Filed: Feb. 10, 1993

[30] Foreign Application Priority Data

Mar. 17, 1992 [JP] Japan .................................. 4-060254

[51] Int. Cl.$^5$ .......................................... G11B 7/085
[52] U.S. Cl. ........................................ 369/116; 369/59
[58] Field of Search .................. 369/100, 116, 115, 59, 369/, 53, 62

[56] References Cited

U.S. PATENT DOCUMENTS 5,067,122 11/1991 McGee ............................. 369/100

OTHER PUBLICATIONS

J. Magn. Soc. Jpn. vol. 15 1991 pp. 293–298.
Jpn. J. Appl. Phys. vol. 31 (1992), pp. 411–413, Part I, No. 2B Feb. 1992.
J. Magn. Soc. Jpn., vol. 15, Supplement No. S1 (1991) pp. 447–448.

Primary Examiner—Constantine Hannaher
Assistant Examiner—Don Wong
Attorney, Agent, or Firm—Wolf, Greenfield & Sacks

[57] ABSTRACT

An information storage system for recording and reproducing information by use of irradiating light on a medium capable of overwriting information is provided. The information storage system is capable of recording information even if the light intensity is varied so as to enhance reliability. The intensity of the light at the time of overwriting is modulated, the more intense light intensity being $P_H$ and the less intense light intensity being $P_L$. The system includes a mechanism to keep relationship of $P_H + \alpha P_L$ equal to a constant ($\alpha$ being a constant depending on the recording conditions). The laser drive circuit is so adjusted that $P_H$ and $P_L$ always provide an optimal condition even if $P_H$ and/or $P_L$ vary. Thus recording can always be performed under optimal conditions to enhance the reliability of the information storage system to expand the power margin of a recording medium and to increase the percentage yield of information medium.

8 Claims, 5 Drawing Sheets

● OPTIMAL POINT

▭ POWER MARGIN (PRIOR ART)

▭ POWER MARGIN (INVENTION)

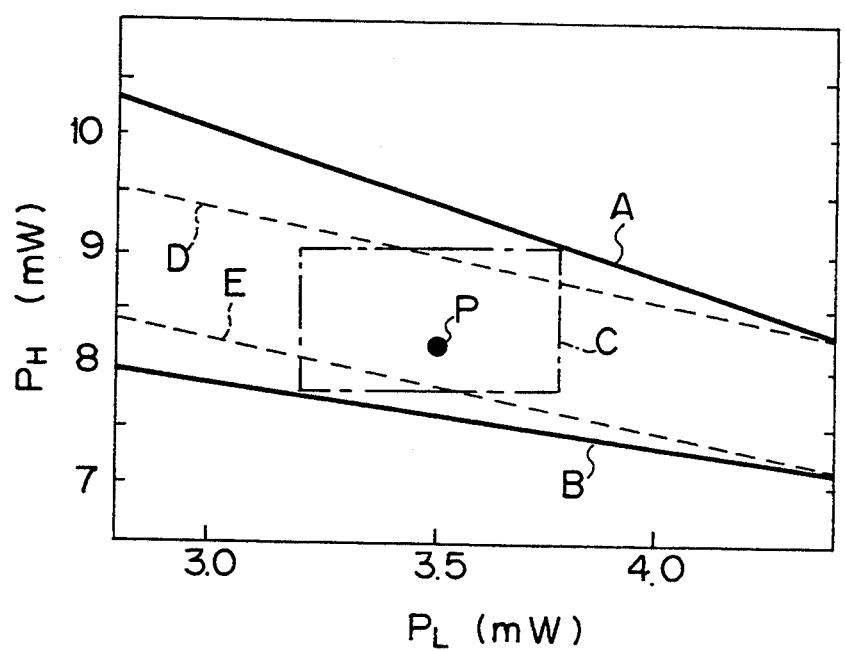

INFORMATION STORAGE SYSTEM

BACKGROUND OF THE INVENTION

1. Field of the Invention

The present invention relates to an information storage system for recording and reproducing information by use of a light (or laser beam) and more specifically to an information storage system capable of recording new information without erasing previously recorded information (or direct overwrite) at the time of recording.

2. Description of Prior Art

An overwrite operation may be executed by modulating the light intensity at the time of recording into binary values of $P_H$ and $P_L$ for a recording medium capable of overwriting, as disclosed in the Journal of Magnetics Society of Japan, Vol. 15 Supplement No. S1, 1991, pp 293–298.

Normally, the value of $P_L$ is set at a value larger than the light intensity $P_R$ at the time of reproduction, such that at the time of designing a real information storage system the laser drive circuit must be so designed as to be capable of modulating the light intensity independently into three values, i.e., $P_H$, $P_L$ and $P_R$. In addition, in order to ensure a reliable recording operation, $P_H$ and $P_L$ values have to be established to attain an optimal condition.

A constitution of such a recording system according to a prior art is shown in FIG. 1. The information storage system shown in FIG. 1 is designed to detect the values of $P_H$ and $P_L$ and restore them to the original set values when the values of $P_H$ and $P_L$ which were set to an optimal condition are varied due to certain conditions, as explained below. In FIG. 1, the values of $P_H$ and $P_L$ (i.e., the values for the optimal conditions) set by a reference value setting circuit 5 are respectively transmitted to a laser drive circuit 3 through a $P_H$ value setting circuit 6 and a $P_L$ value setting circuit 7, respectively. The $P_H$ and $P_L$ values thus transmitted drive a laser diode 1 so as to modulate the laser light of the laser diode 1 into the light intensity of two levels corresponding to $P_H$ and $P_L$ in accordance with the binary information "a" from a data modulating circuit 4. The intensity of the light irradiated from the laser diode 1 is converted into electrical signals by a photodiode 2 for monitoring by a laser beam intensity monitoring circuit 8, and the $P_H$ and $P_L$ values are respectively monitored at a peak value detection circuit 9 and a bottom value detection circuit 12. The $P_H$ and $P_L$ values thus detected are compared by a comparison circuit 10 with the $P_H$ and $P_L$ values which have been set by the reference value setting circuit 5 and serve as the reference values. If there is any deviation from the reference values, such deviation is respectively compensated by a $P_H$ compensation circuit 11 and a $P_L$ compensation circuit 13, and the relative control signals are sent to the $P_H$ value setting circuit 6 and the $P_L$ value setting circuit 7 respectively, such that the compensated $P_H$ and $P_L$ values cause the laser diode 1 to be driven. Thus, the laser diode 1 is modulated by the desired light intensities of $P_H$ and $P_L$ values corresponding to the initial set values of $P_H$ and $P_L$.

Since the storage system having a laser drive circuit as explained above according to a prior art controls $P_H$ and $P_L$ values independently, it is necessary to produce a recording medium having a wide range of laser beam intensity (or so-called power margin) so that the signal characteristics at the time of reproduction are not varied in relation to the optimal value at the time of recording even if the laser beam intensity may deviate from the optimal value set in advance for $P_H$ and $P_L$ respectively.

Namely, even if such a circuit as shown in FIG. 1 is used, which is adapted to compensate for the variation of the light intensities of $P_H$ and $P_L$, the ultimate values of $P_H$ and $P_L$ are likely to deviate from the desired optimal values by $\pm 10\%$, for example, due to variation of the application environment, such as variation of the application temperature between 0° and 50° C., variation of the irradiation characteristic of the laser diode 1 with age, variation of the light reception sensitivity of the photodiode 2 for monitoring and so forth. Furthermore, since the values of $P_H$ and $P_L$ are controlled independently, deviation of the $P_H$ and $P_L$ values from the optimal values occurs independently of each other. Suppose that, if the intensity of the laser diode 1 is varied to the optimal light intensity values of $P_H$ and $P_L$ by using signals with 50% duty, and the information which has been recorded on a recording medium by the intensity of the laser diode 1 varied as mentioned above is reproduced, the duty of the reproduced signal becomes 50%. In the above-mentioned case, the allowable deviation of the duty of the reproduced signal is in the order of $\pm 4\%$, for example, in such an information storage system designed to attain a reproduced signal with 50% duty. As explained above, if the light intensity values of $P_H$ and $P_L$ deviate by $\pm 10\%$ independently from the respective desired optimum values, the deviation of duty of the reproduced signal exceeds the allowable range of $\pm 4\%$. In view of this problem, there has been a need to produce a recording medium which attains in itself a wide power margin.

Furthermore, since the $P_L$ value is smaller than the $P_H$ value, it is difficult to control $P_L$ and $P_H$ with the same accuracy.

SUMMARY OF THE INVENTION

Accordingly, an object of the present invention is to solve the problem described above and provide a reliable recording by controlling the recording conditions always to the optimal condition and thereby widen the power margin of a recording medium so that a recording medium can be easily produced and an inexpensive recording medium can be provided.

In order to attain the above-mentioned object, an information storage system according to the present invention is a storage system for recording and reproducing information by use of light, said storage system being capable of recording new information on an information recording medium without requiring an operation to erase recorded information, said storage system overwriting information by modulating the intensity of the light irradiating on said medium into binary values, and further being characterized in that, if light of greater intensity is assumed to be $P_H$ and if light of lesser intensity is assumed to be $P_L$, as the light intensities at the time of overwriting information, the value of $P_H + \alpha P_L$ is made constant (where $\alpha$ is a constant, the value of which depends on the conditions at the time of recording).

Accordingly, since the information storage system according to the present invention executes control of $P_H$ and $P_L$ according to a constant relational expression with regard to $P_H$ and $P_L$, the relationship between $P_H$ and $P_L$ always satisfies the optimal condition at the time of recording despite variation of either $P_H$ or $P_L$ or both $P_H$ and $P_L$. Thus, the information storage system is capable of recording information with a higher accuracy and under optimal conditions compared to the case of $P_H$ and $P_L$ being independently controlled.

To this end, the range of the laser intensity in which the characteristics of a recording medium are invariable (that is, power margin) is expanded more widely than in the case of the values $P_H$ and $P_L$ being independently controlled the recording medium is more easily manufactured and the percentage yield thereof increases to provide economical recording mediums.

BRIEF EXPLANATION OF THE DRAWINGS

FIG. 5 illustrates the improvement in the power margin attained by the present invention.

DESCRIPTION OF PREFERRED EMBODIMENTS

Firstly, the inventive principle of the information storage system according to the present invention is explained by referring to a magneto-optical disc capable of overwriting.

Figure 2:
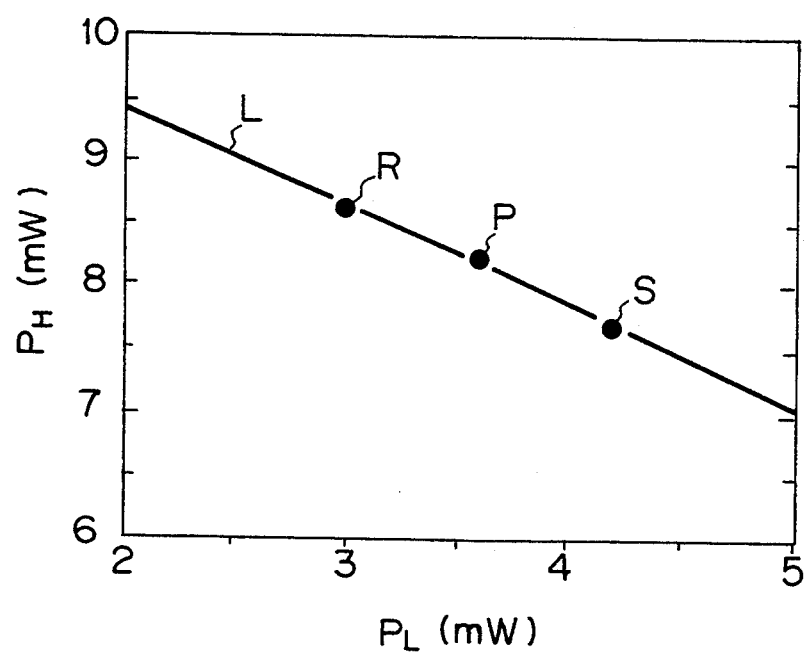
FIG. 2 illustrates the relationship between light intensities of $P_H$ and $P_L$ of which the duty of the reproduced signal is 50% when 50% duty signals having a recording frequency of 2 MHz are recorded on a recording medium by varying the light intensities to $P_H$ and $P_L$ values.

The inventors of the present invention tried experimentally to obtain the combination of or the relationship between the light intensities $P_H$ and $P_L$ in which the duty of the reproduced signals are 50%, when signals with 50% duty at a specified recording frequency are recorded on a recording medium with the light intensities varied to two different values of $P_H$ and $P_L$. In FIG. 2, three sets of measurement values of the light intensities of $P_H$ and $P_L$, or R, P, S are plotted, the light intensities being provided in the case of signals recorded on a recording medium at a recording frequency of 2 MHz and under the above-mentioned conditions. In FIG. 2, the straight line L is drawn to intersect these three sets R, P and S. As is seen from FIG. 2, the inventors of the present invention found that the combination which satisfies the optimal condition to enable the reproduced signals to attain 50% duty may be expressed by a linear relation and have expressed such relation as $P_H + \alpha P_L =$ constant.

It has also been recognized experimentally that even if a magneto-optical disc which is a recording medium having recording sensitivity characteristics different from the recording sensitivity characteristics shown in FIG. 2 (for example, $P_H = 8.3$ mW and $P_L = 3.5$ mW at the point P) is used, such a linear relation between $P_H$ and $P_L$ may be obtained. It has also been found that the value of $\alpha$ is between 0.6 and 1.2 in various cases including the case of FIG. 2.

It is to be noted that in the example as above described, a recording signal of 50% duty and a reproduced signal of 50% duty were utilized, but the duties not only of the recording signal but also of the reproduced signal must be limited to 50%. It is to be understood that the linear relationship between $P_H$ and $P_L$ may be applied according to the present invention when a recording signal having a specified duty is to be recorded and a reproduced signal having a specified duty is to be obtained.

Now assume that the optimal recording condition is $P_H = 8.3$ mW and $P_L = 3.5$ mW, such as point P in FIG. 2, and that the value of $P_H$ becomes 7.5 mW for some reason at the time of recording. In case of a conventional system shown in FIG. 1, since $P_H$ and $P_L$ are controlled independently, the value of $P_H$ alone has been reduced with $P_L = 3.5$ mW remaining unchanged, whereby the recording intensity is insufficient for the optimal condition.

In the information storage system according to the present invention, the $P_H$ value at the time of recording is monitored and compared to the value set in advance (or the target value), and the $P_L$ value is controlled (or increased) so as to attain $P_H + \alpha P_L =$ constant if the compared value deviates from (or is smaller than) the $P_H$ target value. This operation compensates the insufficient light intensity and allows recording to be executed at the optimal condition (more specifically, $P_L$ is made smaller if $P_H$ is larger than the target value, for example). It is possible to alternatively monitor the $P_L$ value instead of the $P_H$ value and control the $P_H$ value in order to attain $P_H + \alpha P_L =$ constant.

Examples of the constitution according to the present invention will next be explained in which a $P_H$ value of greater intensity and a $P_L$ value of lesser intensity as the laser light intensities are controlled in order to attain the relationship of $P_H + \alpha P_L =$ constant.

Figure 1:
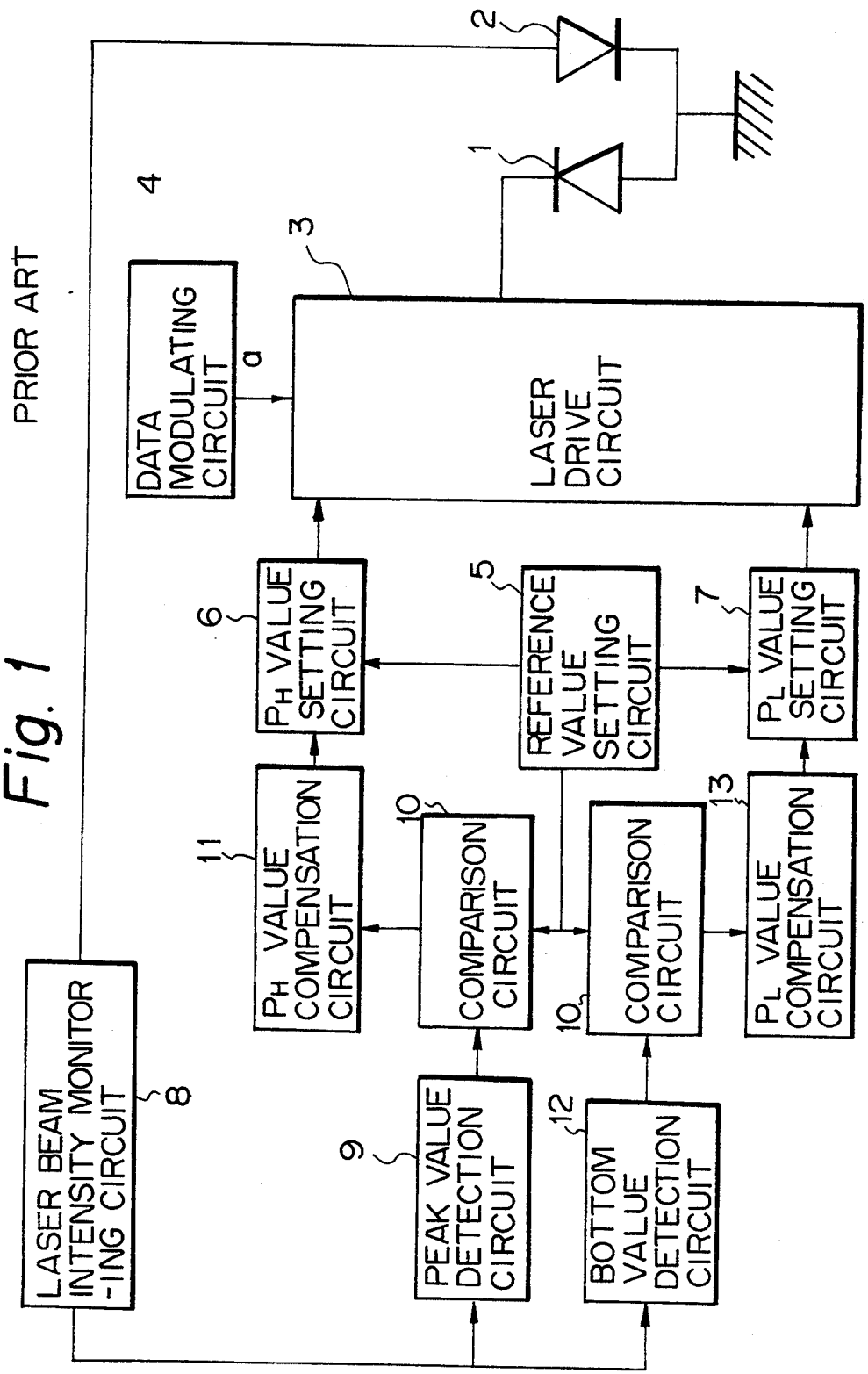
FIG. 1 illustrates the constitution of an example of a conventional information storage system for storing information on a magneto-optical disc by use of two different light intensities.
Figure 3:
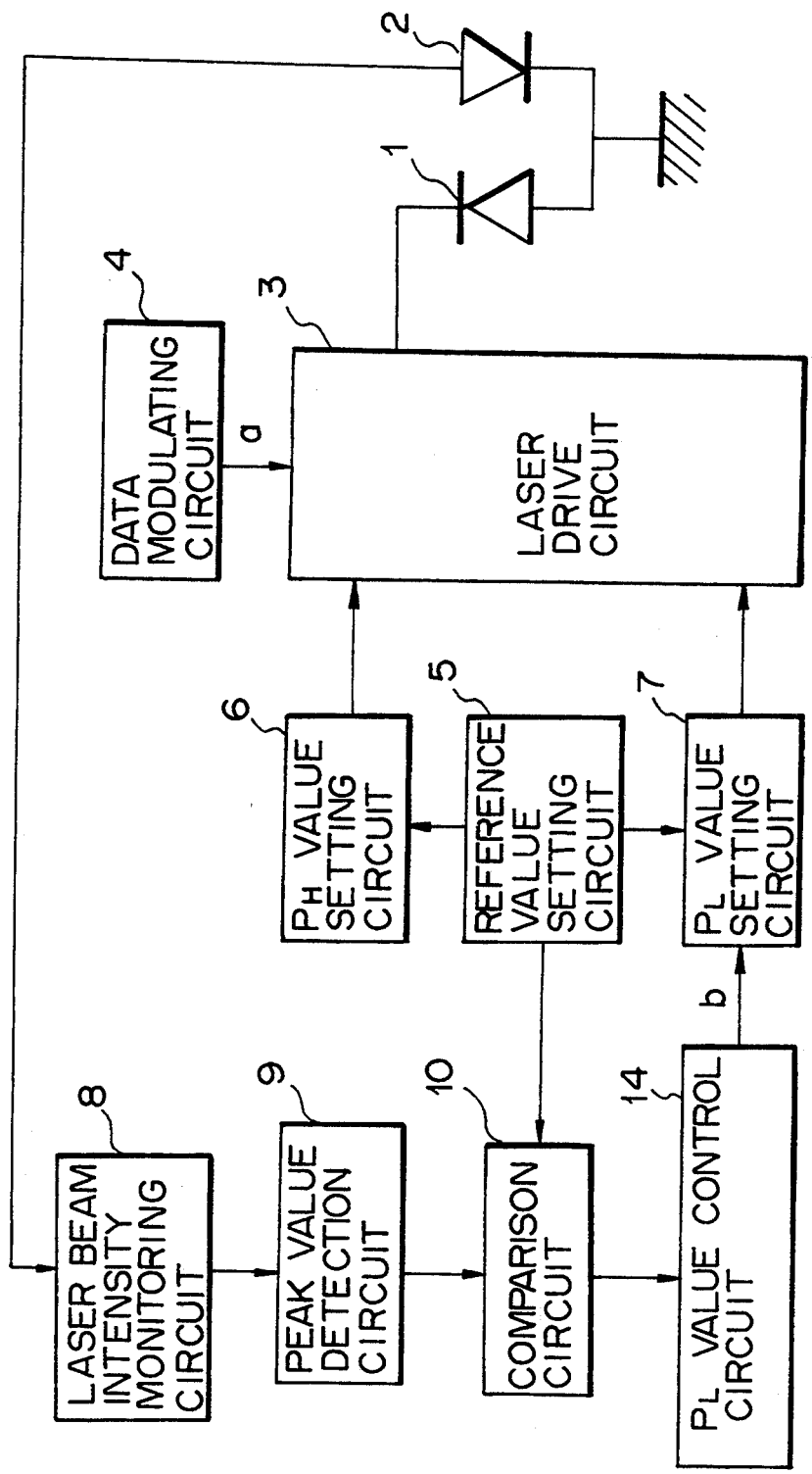
FIG. 3 illustrates the constitution of an embodiment of the information storage system according to the present invention, for storing information on a magneto-optical disc by use of two different light intensities.

FIG. 3 illustrates the constitution of an embodiment of the present invention in which reference numerals 1–10 are identical to those shown in FIG. 1 illustrating a conventional system. The values of $P_H$ and $P_L$ set by the reference value setting circuit 5 (or the optimal condition) are transmitted to the laser drive circuit 3 through the $P_H$ value setting circuit 6 and the $P_L$ value setting circuit 7 respectively, to drive the laser diode 1 so as to modulate the laser light of the laser diode 1 to the light intensities having the two different values of $P_H$ and $P_L$ in accordance with the binary information "a" from the data modulation circuit 4. According to the present embodiment, $P_H$ and $P_L$ values are set such that $P_H$ is 8.3 mW and $P_L$ is 3.5 mW or, in other words, the combination at point P in FIG. 2 is obtained.

The intensity of the light irradiated by the laser diode 1 is converted into electrical signals by the photodiode 2 for monitoring, and by the laser beam intensity monitoring circuit 8, and the $P_H$ value is monitored at the peak value detection circuit 9. This value is compared to the reference value by the comparison circuit 10, and the control signal "b" is transmitted by the $P_L$ value control circuit 14 to the $P_L$ value setting circuit 7 so that deviation from the reference value is controlled to attain $P_H + 0.8 P_L = 11.1$ with $\alpha = 0.8$. The corrected modulation current from the laser drive circuit 3 causes the laser diode 1 to be driven so that recording can be executed at the optimal condition.

Figure 4:
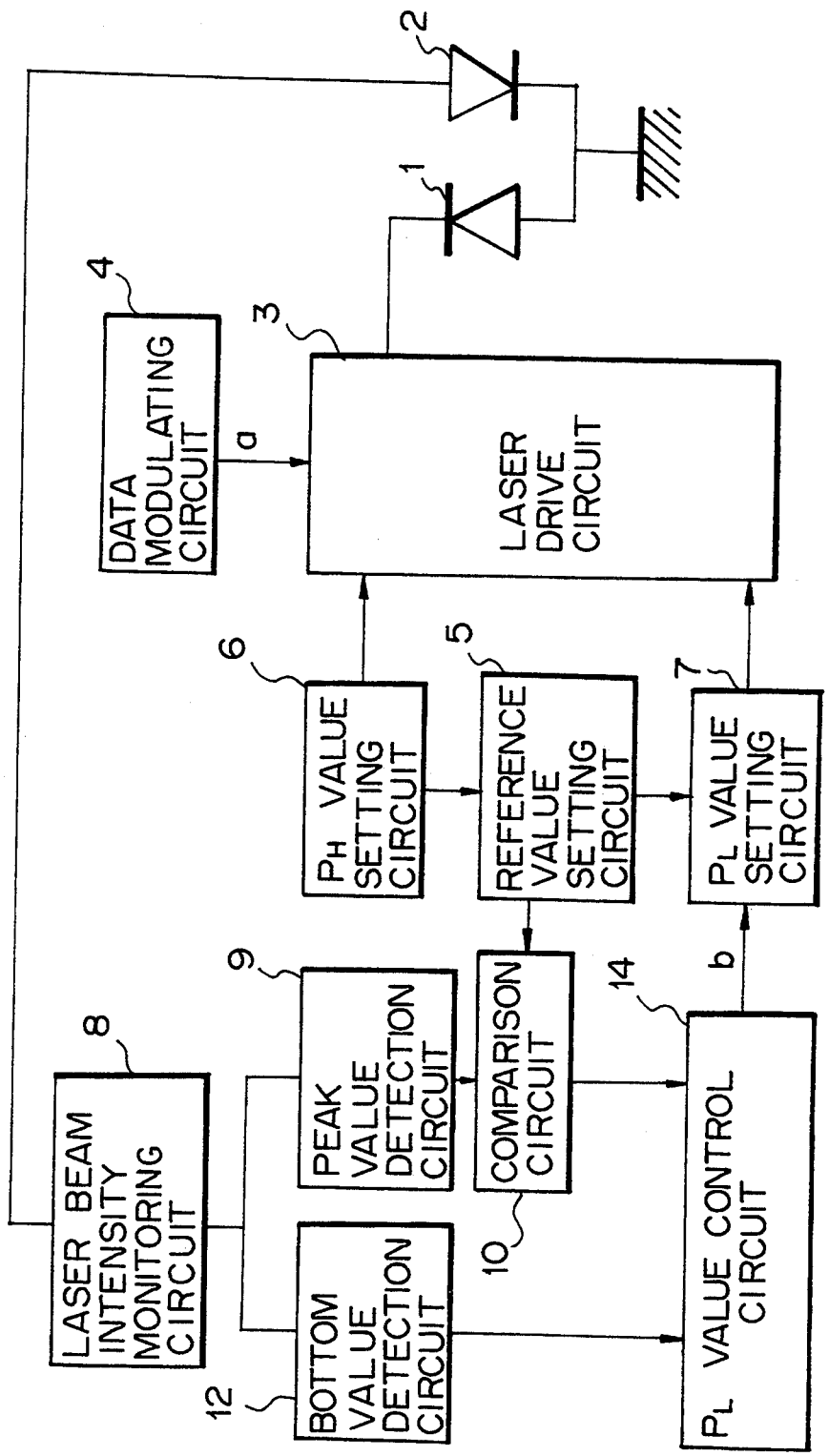
FIG. 4 illustrates the constitution of another embodiment of the information storage system according to the present invention, for storing information on a magneto-optical disc by use of two different light intensities.

FIG. 4 illustrates the constitution of another embodiment of the present invention. While in the embodiment shown in FIG. 3 the peak value alone was monitored and the $P_L$ value was controlled, in the present embodiment, a bottom value detection circuit 12 is provided in parallel with the peak value detection circuit 9 after the laser beam intensity monitoring circuit 8, so that the bottom value from the photodiode 2 is detected for monitoring and input to the $P_L$ value control circuit 14 to assist setting of the $P_L$ value, resulting in more precise control of the $P_L$ value. The remaining constitution of the system circuit is the same as the one shown in FIG. 3.

In the respective embodiments above-described, a magneto-optical disc having an optimal condition of $P_H=8.3$ mW and $P_L=3.5$ mW was employed. It was found, however, that favorable recording and reproduction characteristics were obtained in a system employing a magneto-optical disc having different recording sensitivities such as $P_H=7$ mH, $P_L=3$ mW by setting the value of $\alpha$ between 0.6 and 1.2. In this case, $P_H$ is based on a signal having 50% duty or on the time sharing between $P_H$ and $P_L$ being 1:1. It is also possible, however, to attain an optimal recording condition even when a signal duty is not 50% by suitably varying the value of $\alpha$.

In the foregoing description, the value of $\alpha$ was treated as a constant. Since $\alpha$ varies depending on the ambient temperature at the time of recording and the recording conditions, more reliable recording and reproduction are made possible by varying $\alpha$ in accordance with the ambient temperature and the recording conditions and hence the reliability of a system may be enhanced.

Further according to the present invention, the power margin of a recording medium can be expanded. More specifically, supposing that the variation of the duty of a reproduction signal allowable in an information storage system is 50%±4% for example. The range of the values of $P_H$ and $P_L$ which satisfies this condition, in a medium having the characteristic shown in FIG. 2, is defined by two upper and lower straight lines A and B as shown in FIG. 5. The straight line A exhibits the duty of the reproduced signal being 50%+4% while the straight line B exhibits the duty of the reproduced signal being 50%−4%. In the conventional information storage system shown in FIG. 1, since the values of $P_H$ and $P_L$ are controlled independently, the effective power margin is defined by the area confined by a rectangle C in contact with these two straight lines A, B and containing the optimal recording point P within the rectangle C. In the meantime, according to the present invention, the effective power margin is defined by the area defined by the two dashed lines D, E obtained by shifting the straight line in FIG. 2 exhibiting the optimal condition vertically in parallel, whereby a larger margin can be provided than by a conventional system.

Although, in the embodiments mentioned above, the value of $P_L$ was controlled to attain the optimal condition, a similar effect can of course be attained by controlling the value of $P_H$ so that the relationship of $P_H+\alpha P_L=$ constant is provided The present invention has been described in detail with reference to certain preferred embodiments thereof, but it will be understood that variations and modifications can be effected within the spirit and scope of the invention.

What is claimed is:

1. An information storage system for recording and reproducing information by use of irradiating a light on an information medium capable of recording new information without erasing previously recorded information, the system comprising:

a drive circuit for executing overwriting of information on the medium by modulating the intensity of light irradiated on said information medium into binary values, wherein a more intense light for overwriting information having the value of $P_H$ and a less intense light having the value of $P_L$, said drive circuit being responsive to a control signal, and means for maintaining $P_H+\alpha P_L$ at a constant level, said means for maintaining monitoring the irradiated light and having means for providing the control signal so as to control the level of irradiated light; wherein $\alpha$ is a constant, the value of which depends on the conditions at the time of recording.

2. The information system of claim 1, wherein $\alpha$ is a value between 0.6 and 1.2.

3. The information system of claim 1 wherein the means for maintaining is responsive to the ambient temperature of the system.

4. The information system of claim 1, wherein the means for maintaining comprises:

detector means for monitoring the level of irradiated light;

comparison means for comparing an output of the detector means with a reference value, wherein the means for providing is responsive to the comparison means; and wherein the drive circuit includes value setting means responsive to the control signal for outputting a $P_H$ value signal and a $P_L$ value signal.

5. The information system of claim 4 wherein $\alpha$ equals 0.8 and the constant equals 11.1.

6. The information system of claim 4 wherein the detector means detects the peak value of irradiated light and wherein the means for providing provides the control signal so as to control the $P_L$ value output by the value setting means.

7. The information system of claim 4 wherein the detector means detects the peak value of irradiated light and a bottom value of irradiated light and wherein the means for providing receives an indication of bottom value detection.

8. The information system of claim 4 wherein the means for providing is responsive to the ambient temperature of the system.

* * * * *